United States Patent
Grabowski et al.

(10) Patent No.: US 6,221,815 B1
(45) Date of Patent: *Apr. 24, 2001

(54) DIESEL FUEL AND LUBRICATING OIL ANTIFORMS AND METHODS OF USE

(75) Inventors: Wojciech Grabowski, Gland; Rolf Haubrichs, Geneva, both of (CH)

(73) Assignee: Crompton Corporation, Greenwich, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/327,686

(22) Filed: Jun. 8, 1999

Related U.S. Application Data

(63) Continuation of application No. 08/829,969, filed on Apr. 3, 1997, now Pat. No. 6,001,140.
(60) Provisional application No. 60/014,836, filed on Apr. 4, 1996.

(51) Int. Cl.$^7$ .................................................. C10M 155/02
(52) U.S. Cl. ............................................. 508/208; 528/10
(58) Field of Search ............................... 44/320; 508/208; 528/10

(56) References Cited

U.S. PATENT DOCUMENTS

| | | | |
|---|---|---|---|
| 3,233,986 | 2/1966 | Morehouse | 44/320 |
| 3,381,019 | 4/1968 | Morehouse . | |
| 3,384,599 | 5/1968 | Omietanski et al. | 252/182.14 |
| 3,507,815 | 4/1970 | Bailey | 260/25 |
| 3,794,673 | 2/1974 | Boersma et al. . | |
| 3,935,133 | 1/1976 | Van Leuwen et al. | 260/2.5 AH |
| 4,417,068 | 11/1983 | Kollmeier et al. . | |
| 4,690,688 | 9/1987 | Adams et al. . | |
| 4,746,683 | 5/1988 | Kilgour | 521/112 |
| 4,854,938 | 8/1989 | Easton et al. | 44/56 |
| 4,996,277 | 2/1991 | Bradshaw et al. | 528/15 |
| 5,041,468 | 8/1991 | Budnik et al. | 521/112 |
| 5,045,571 | 9/1991 | Blevins et al. | 521/112 |
| 5,070,112 | 12/1991 | Grabowski | 521/112 |
| 5,192,812 | 3/1993 | Farris et al. | 521/112 |
| 5,231,157 | 7/1993 | Herzig et al. | 528/15 |
| 5,397,367 | 3/1995 | Fey et al. . | |
| 5,417,867 | 5/1995 | Mikami et al. . | |
| 5,424,384 | 6/1995 | Gentle et al. | 528/12 |
| 5,428,142 | 6/1995 | O'Lenick, Jr. | 536/1.11 |
| 5,432,206 | 7/1995 | Blevis et al. | 521/111 |
| 5,435,811 | 7/1995 | Fey et al. . | |
| 5,446,119 | 8/1995 | Herzig et al. | 528/26 |
| 5,474,709 | 12/1995 | Herzig et al. | 252/321 |
| 5,482,775 | 1/1996 | Miyabayashi . | |
| 5,492,939 | 2/1996 | Stanga et al. | 521/112 |
| 5,542,960 | 8/1996 | Grabowski . | |
| 5,613,988 | 3/1997 | Spiegler | 44/320 |
| 5,620,485 | 4/1997 | Fey | 44/320 |
| 5,639,844 | 6/1997 | Blum et al. | 428/15 |
| 5,650,449 | 7/1997 | Mukuno et al. | 521/111 |
| 5,654,362 | 8/1997 | Schultz et al. | 524/862 |
| 5,661,202 | 8/1997 | Akamatsu et al. | 524/265 |
| 5,750,643 | 5/1998 | Blum et al. | 528/481 |
| 5,789,454 | 8/1998 | McVey | 521/112 |
| 5,844,010 | 12/1998 | Burkhart et al. | 521/112 |
| 5,891,977 | 4/1999 | Dietz et al. | 528/15 |
| 6,001,140 | * 12/1999 | Grabowski et al. | 44/320 |

FOREIGN PATENT DOCUMENTS

| | | |
|---|---|---|
| 393509B | 11/1991 | (AT) . |
| 4032006A1 | 4/1992 | (DE) . |
| 4306041 A1 | 9/1994 | (DE) . |
| 43 18539 A1 | 12/1994 | (DE) . |
| 4343235C1 | 12/1994 | (DE) . |
| 4325359A1 | 2/1995 | (DE) . |
| 19516360 C1 | 5/1996 | (DE) . |
| 43 18537 A1 | 12/1999 | (DE) . |
| 0398745 | 5/1990 | (EP) . |
| 0475130A2 | 8/1991 | (EP) . |
| 0 662 334 A2 | 7/1995 | (EP) . |
| 0 741 182 | 11/1996 | (EP) . |
| 0849352 A1 | 6/1998 | (EP) . |
| 0875520 A1 | 11/1998 | (EP) . |
| 2579481 A1 | 10/1986 | (FR) . |
| 2646672 A1 | 11/1990 | (FR) . |
| 707 906 | 4/1954 | (GB) . |
| 2173510 | 10/1986 | (GB) . |
| 92/05854 | 4/1992 | (WO) . |
| 97/38067 | 10/1997 | (WO) . |

OTHER PUBLICATIONS

Patent abstracts of Japan, appln No. 02124369, May 15, 1990.

Abstract of EP 0 662 334 Jul. 12, 1995.

J. Marcromol. Sci. Pure Applied Chem. (1994) A31 (3), 305–18.

Polymer (1989) 30(3) 553–7.

J. Appl. Polym. Sci. (1995) 55(4) 611–19.

Derwent WPI Abstract of DE 43 18539, Dec. 1994.

Derwent WPI Abstract of DE 43 18537, Dec. 1999.

* cited by examiner

*Primary Examiner*—Margaret Medley
*Assistant Examiner*—Cephia D. Toomer
(74) *Attorney, Agent, or Firm*—Shirley S. Ma., Esq.

(57) ABSTRACT

The present invention relates to diesel fuel and lubrication oil defoaming agents, and crude oil demulsifiers, as well as methods for using same. In particular, the defoaming agents and demulsifiers are comprised of copolymers which have structures constituting a backbone of polysiloxane onto which is grafted an organic group. These structures comprise a polymer of the formula $MD_xD'_yD''_zM$, where M is $O_{0.5}Si(CH_3)_3$, D is a $OSi(CH_3)_2$, D' is $OSi(CH_3)R$, D' is $OSi(CH_3)R'$, R is a polyhydric $C_6$–$C_{28}$ organic group, R' is a phenol derivative or a long chain aliphatic group or polyethers, z is between 0 and 80, $x+y+z$ is between 10–200, $x/z$ is $\geq 1$, and $x/(y+z)$ is between about 1 and about 5, or formula $M'D_aM'$ where M' is $O_{0.5}Si(CH_3)_2R$, a is between 4–10, and R and D are the same as defined above.

6 Claims, No Drawings

DIESEL FUEL AND LUBRICATING OIL ANTIFORMS AND METHODS OF USE

This application is a continuation of application Ser. No. 08/829,969, filed Apr. 3, 1997 now U.S. Pat. No. 6,001,140, which claims benefit of US provisional application 60/014,836, filed Apr. 4, 1996.

BACKGROUND OF THE INVENTION

1. Field of the Invention

This invention relates to defoaming agents for petroleum products (such as diesel fuel and lubricating oils) and crude oil demulsifying agents, and methods for using them.

2. Description of Related Art

Diesel fuel is a mixture of a variety of hydrocarbons. Most of the hydrocarbons are aliphatic, but aromatics may be present at up to twenty to twenty-five weight percent of the fuel. The mixture can also include kerosine or gas oil. Diesel fuel is commonly used in motor vehicles, and has a tendency to foam profusely when it is poured into the fuel tank of a motor vehicle. It is therefore desirable to reduce such foaming, which can be accomplished by the addition of a defoamer.

Oil companies treat diesel fuel with organic additives, such as detergents, cetane improvers, viscosity breakers and occasionally perfumes (collectively referred to as "DAP"). Each oil company has its own preferred DAP which it typically uses only for mixing with its own fuel. All of these organic additives must be compatible with the defoamer.

Diesel fuels delivered to filling stations also may contain some amount of dispersed or dissolved water which can adversely affect the performance characteristics of previously known defoamers. The water causes a decay in defoaming characteristics and in some extreme cases, may cause the defoamer to enhance foaming, rather than suppress it. Such wet defoamers also can result in increased sludge deposition in the fuel tank.

U.S. Pat. No. 4,690,688 issued to Adams et al. discloses a typical prior art polysiloxane for use as a defoamer, wherein the polysiloxane is a copolymer with polyether side chains that provide at least 25 weight percent of the copolymer. However, these polysiloxane copolymers do not work well in wet diesel fuel because the ethers, as a hydrophilic material, will tend to stabilize the foaming of wet fuel. Additionally, to function properly these polysiloxanes must be present at levels in diesel fuel above those desirable in engine systems.

DE 4032006 describes a process for defoaming and/or degassing organic systems, including diesel oil, by adding a foam suppressant containing an organo-polysiloxane with unsaturated sidechains. A disadvantage of this foam suppressant is that it contains high levels of silicon, which can be harmful to engines. In addition, it can be incompatible with DAP and does not age well.

Lubricating oils are often comprised of mixtures of a hydrocarbon base (for example, mineral oil) and components which enhance lubrication performance (esters, for example). For instance, typical oils contain highly refined parafinic hydrocarbon stock, or synthetic polyolefins. During application and use (for instance, in lubricating gear boxes or turbines), such lubrication oil products have a tendency to foam abundantly. Such foaming, in combination with the propensity in moving machinery parts for air to be trapped, can adversely affect the lubricity, which can be detrimental to fast moving parts of machinery. Consequently, abatement of foam and rapid deaeration of lubricating oils is a serious technical requirement for use of lubricating oils.

Standard silicone oils can be used to prevent foaming of lubricating oils, and are efficient defoamers at very low rates (about 10–20 ppm). However, their use usually results in an undesirably low deaeration rate. The more efficient the silicone oil defoamer is the more pronounced is the problem of deaeration. For instance, silicone oils typically trap and retain air for about 10 minutes after the stream of passing air is switched off.

Organic defoamers (such as polyacrylate-based defoamers, which are presently popular in the art) are effective lubrication oil defoamers at concentrations from about 100–200 ppm. However, their efficiency as defoamers is very low at concentrations between about 10–50 ppm. While organic defoamers provide a satisfactory deaeration rates, the treat rates are undesirably high, and are even several times higher than the treat rates for silicone oils.

In testing these current defoamers, a strong stream of air is passed through oil during predetermined time and measuring the density of such frothed oil with time. The density of froth formed is much lower than that of a virgin air-free oil. The faster dearation means that the density of oil will be higher after, for example, 10 minutes. Thus, for an oil having a density of 0.872 the initial froth density is 0.810 due to air whipped; it regains its original value for untreated oil after 10 minutes while the densities after 10 minutes are 0.832 and 0.844 for oil treated with 10 ppm of silicone oil or 200 ppm of organic defoamer, respectively.

In general, in the petroleum industry, before oil is shipped from a refinery it must go through a process of demulsification, whereby undesired water is separated from the crude oil and removed. Currently, demulsification is carried out using an organic demulsifier, such as TROS6002X produced by TROS Company, in amounts of about 100 ppm. The organic demulsifier is usually dissolved in an aromatic compound, and then added to crude oil to effect demulsification. The amount of demulsifier depends on the type of crude oil and amount of water in the crude oil.

SUMMARY OF THE INVENTION

Accordingly, objects of the present invention include the development of defoamers that address the afore-described problems in the art.

In one embodiment, the invention contemplates a class of organosilicone copolymers which may be used to abate the foaming of petroleum products, such as diesel fuel and lubricating oils. These copolymers have structures constituting a backbone of polysiloxane onto which is grafted an organic group. Consequently, in this patent the term copolymers is intended to encompass organomodified polysiloxanes. In particular, the defoaming agents can comprise a polymer of the formula $MD_xD'_yD''_zM$, where M is $O_{0.5}Si(CH_3)_3$, D is $OSi(CH_3)_2$, D' is $OSi(CH_3)R$, where R is a polyhydric (i.e., contains at least 2 hydroxyl groups) $C_6$–$C_{28}$ organic group, which preferably has a molecular weight between about 134 and about 644, and which is completely saturated, D" is $OSi(CH_3)R'$, where R' is a phenol derivative or a long chain ($C_{10}$–$C_{20}$) aliphatic group or polyethers, z is between 0 and 80, x+y+z is between 10–200 (and preferably between 20–160), $x/z \geq 1$, and x/(y+z) is between about 2.0 and about 10.0 (and preferably between about 3.0 to about 6.0). The polymer should be present in sufficient amounts (i.e., effective amounts) to reduce foaming of petroleum products, and preferably present at about 1.0 to about 5.0 ppm, which results in Si levels of between about 0.22 to about 1.10 ppm.

In addition to the previous formula, the defoaming agents can comprise a polymer of the formula M'D$_a$M' where M' is O$_{0.5}$Si(CH$_3$)$_2$R, R and D are the same as defined above, and a is between 4–10 (and preferably between 5–8). The polymer should be present in sufficient amounts to reduce foaming of petroleum products, and preferably present at about 4 ppm. The defoaming agents can be comprised of polymers of either formula MD$_x$D'$_y$D"$_z$M or formula M'D$_a$M' alone, or can comprise mixtures of both.

In a related embodiment, the invention relates to methods of reducing foaming of petroleum products. The methods comprise adding to a petroleum product (such as diesel fuel and lubricating oil) a composition comprising a polymer of the formula MD$_x$D'$_y$D"$_z$M (as described above) and/or formula M'D$_a$M' (as described above), in amounts effective to reduce foaming of the petroleum product (as described above).

It is a further object of the present invention to provide lubricating oil defoamers which demonstrate an acceptably high rate of deaeration. Thus, in another embodiment, the invention contemplates a class of organosilicone copolymers which may be used to defoam lubricating oil. These copolymers can comprise a polymer of the formula MD$_x$D'$_y$D"$_z$M (as described above) and/or formula M'D$_a$M' (as described above), and should be present in sufficient amounts to effect defoaming of lubricating oils, preferably below 100 ppm, and more preferably between 20 and 50 ppm. The defoaming agents can be comprised of polymers of either formula MD$_x$D'$_y$D"$_z$M or formula M'D$_a$M' alone, or can comprise mixtures of both.

In a related embodiment, the invention relates to methods of defoaming lubricating oil. The methods comprise adding to lubricating oil a composition comprising a polymer of the formula MD$_x$D'$_y$D"$_z$M (as described above) or formula M'D$_a$M' (as described above), in amounts sufficient to effect defoaming of lubricating oil, preferably between 20 and 50 ppm.

It is a further object of the present invention to develop crude oil demulsifiers that address the afore-described problems in the art. Thus, in another embodiment, the invention contemplates a class of organosilicone copolymers which may be used to demulsify crude oil. These copolymers can comprise a polymer of the formula MD$_x$D'$_y$D"$_z$M (as described above) and/or formula M'D$_a$M' (as described above), and should be present in sufficient amounts to effect demulsification of crude oil preferably present at about 5 ppm. The demulsifying agents can be comprised of polymers of either formula MD$_x$D'$_y$D"$_z$M or formula M'D$_a$M' alone, or can comprise mixtures of both.

In a related embodiment, the invention relates to methods of demulsifying crude oil. The methods comprise adding to crude oil a composition comprising a polymer of the formula MD$_x$D'$_y$D"$_z$M (as described above) or formula M'D$_a$M' (as described above), in amounts sufficient to effect demulsification of crude oil, preferably between about 5 ppm.

The copolymers of this invention are themselves novel compounds, irrespective of their suitability as a defoamer of diesel fuel or lubricating oil. This is especially the case where the R group is an alkoxylated allyl sorbitol derivative, an alkoxylated pentaerythiol derivative, and an alkoxylated or non-alkoxylated trimethylpropane derivative.

DETAILED DESCRIPTION OF THE PRESENT INVENTION

The copolymer compositions of the invention include low molecular weight organic moieties of R described above. The hydroxy groups of these organic sidechains effect a high polarity. In some specific cases the polarity of a molecule containing two or more hydroxyls can be adjusted (i.e., reduced) via transformation of a polyhydroxy group into a corresponding acetal or ketal.

The presently described copolymer allows for a low treat rate in diesel fuel and this corresponds to a very low silicon level in fuel (e.g., as low as 0.5 ppm). Thus, one can expect the complete elimination or a substantial reduction of the problems presented by defoamers currently in use. Moreover, the copolymers of the present invention demonstrate high stability in diesel fuel wherein water is dispersed or dissolved.

The advantages of the present invention are made possible by the cografting of the low molecular weight, compact, high polarity organic groups onto a silicone backbone. The substitution of the organic groups surprisingly improves the defoaming ability of the copolymer because it enhances defoaming efficiency and helps to maintain the performance characteristics of the copolymers in diesel fuel wherein water is dispersed or dissolved, and because it allows the complete elimination of foam at low silicon concentration.

In addition, the invention provides an entirely new structure for lubricating oil defoamer effective at concentrations 100 ppm or less, and preferably 50 ppm or less.

In addition, the invention provides an entirely new structure for a crude oil demulsifier, which is advantageous over previous known demulsifiers in that it is effective at very low amounts, such as 10 ppm, whereas the previous known demulsifiers are only effective when present in amounts of about 100 ppm.

Structure of the Copolymer

For the defoaming agents the class of organosilicone copolymers of the present invention is characterized by a combination of high molar fraction of D units and the presence of low molecular weight, compact, organic groups of high polarity. The advantageous properties of the invention may be achieved by a careful selection of a siloxane backbone of the formula MD$_x$D'$_y$D"$_z$M and/or formula M'D$_a$M', as described above. Although linear structures are specifically set forth herein, the invention also contemplates T and Q structures.

Varying the molecular weight of the polysiloxane generally does not alter the polymer properties, but rather the upper limit of x+y+z is determined by the technological capability to handle very viscous silicone hydrides and the lower molecular weight limit is set by the fact that in smaller sized copolymers the distribution of modified groups may cause some copolymers to have no modified groups, where a fraction of the resulting material can be non-modified silicone oil which is either inert or may enhance foaming. The present invention prefers the sum of x+y+z to be between about 10 to about 200, but someone skilled in this art would appreciate that improvements in production ability would allow for use copolymers outside of this range.

The physical properties of polysiloxane copolymer compositions of the invention are determined by variables such as the size of siloxane chain, the degree of substitution with organic groups different than methyl and the nature (polarity) of organic moiety replacing an original methyl group in polysiloxane.

The organic groups (R) contemplated by the invention are mainly aliphatic, low molecular weight diols. The organic group preferably has a molecular weight between about 134 and about 644, and preferably between about 134 and about 400. In addition, the organic group is completely saturated. Before grafting, the organic group R bears an unsaturated terminus such as an allyl, methallyl or a vinyl. For example, the terminus can be an allyl, a methallyl or a vinyl. The unsaturated terminus becomes saturated when the organic group is hydrosilated onto the siloxane backbone. Thus, the resulting siloxane copolymer has no unsaturation.

The organic group grafted on polysiloxane can be described in terms of solubility parameter, which is a thermodynamic measure and is indicative of cohesion forces. Solubility parameters can be calculated from known tables. It is generally accepted that a higher value of solubility parameter for a certain compound corresponds with a higher polarity of that compound. However, a high polarity does not necessarily mean a substance will have high hydrophilicity, even though the converse is true: highly hydrophilic substances have high polarity. Thus, alkylphenol derivatives (eugenol, for example) have a high polarity but are insoluble in water.

Table 1 below provides several solubility parameters.

TABLE 1

| trimethylolpropane monoallyl ether | 25.3 |
| ethoxylated pentaerythritol allyl ether | 25.3 |
| propoxylated pentaerythritol allyl ether | 23.6 |
| tri-isopropanolamine allyl ether | 20.3 |
| glycerol monoallyl ether | 27.1 |

Preferred solubility parameters range between 23 to 35.

For comparison, the adduct of seven moles of methyl capped ethylene oxide on allyl alcohol has a solubility parameter of 18.2 while an ethylene oxide unit has a solubility parameter of 19.2.

The organic group contemplates aliphatic polyhydroxy groups, their alkoxylated derivatives or optionally the cyclic acetals obtained in the reaction of formaldehyde and polyhydroxy species (formals). Preferably, the precursor of the R group is trimethylolpropane monoallyl ether. However, the precursor of the R group can be ethoxylated pentaerythritol allyl ether, propoxylated pentaerythritol allyl ether, tri-isopropanolamine allyl ether, or allylpropanediol 1,3. Diols can be transformed into corresponding cyclic formals via reaction of polyhydroxy compounds with formaldehyde, and the resulting cyclic olefins can be grafted onto the siloxane backbone. Compounds suitable for use as the R group are commercially available from, for instance, Perstorp AB of Sweden.

As someone skilled in the art would appreciate, the R group should be chosen so that the resulting organosilicone copolymer is insoluble in both diesel and water. Thus, the selection of the R group must be balanced against the size of the siloxane backbone to achieve the desired hydrophobic/hydrophilic balance.

For example, by varying the total size of the organosilicones, i.e., $x+y+z$, the ratio of siloxane groups, i.e., $x/(y+z)$, and the nature of the grafted groups, R, one may design a copolymer for particular grades of fuels, particular engine systems and particular conditions of use. The ratio $x/(y+z)$ defines the hydrophilic properties of the copolymer made of a given set of grafted groups and may be adjusted according to the water content of the fuel with which the copolymer is to be used.

For example, a small R group contemplated by this invention is an allylpropanediol 1,3, whereas a large R group is an ethoxylated allyl sorbitol. Many of the organosilicones of this invention are themselves novel compounds, especially where the R group is ethoxylated allyl sorbitol.

An especially preferred R group is trimethylolpropane monoallyl ether (TMPMAE). Other R groups useful in the invention include ethoxylated pentaerythritol allyl ether, propoxylated pentaerythritol allyl ether, tri-isopropanolamine allyl ether, and allylpropanediol 1,3.

TMPMAE and its derivatives provide more surface activity than polyether derivatives for the same siloxane backbone, in spite of the fact that TMPMAE has a higher polarity. This is believed to be due to the compact molecular structure of TMPMAE.

For example, in a preferred composition for both a defoaming agent and a crude oil demulsifier x is 100, y is 24, z is 0, and R is TMPMAE. Similarly, in another preferred composition R is TMPMAE and a is about 7.0. The unique structure of these preferred compositions is particularly advantageous in that the adsorption of the composition is enhanced on different types of surfaces. In addition, some mineral surfaces, such as bentonite, and other surfaces, such as fabric, paper and concrete, may be rendered hydrophobic through the adsorption of these compositions. The adsorption of this preferred composition on a glass plate resulted in a substantial reduction of surface energy of glass. In fact, it is estimated that surface tension of the glass was reduced from about 72 dynes/cm to about 30 dynes/cm. Such a high surface activity of compositions of this invention may explain their efficiency in defoaming and demulsification. However, the extremely low concentrations of organosilicones of the invention does not easily permit an investigation of the details of the mechanism of action. The observations related to the adsorption on solid surfaces may be considered as being parallel to phenomena which occur in a fuel or crude oil and which are related to discrete intermolecular interactions on interfaces.

Manufacture of the Copolymers

Methods for making the defoamer agents and demulsifier agents are known in the art. For instance, U.S. Pat. No. 3,794,693 teaches how to make copolymer compositions.

During manufacture, it is often advantageous to add a solvent to ensure that the reactants are well mixed throughout the reaction. Solvents used for these purposes include DPG (dipropylene glycol), toluene and any other solvent of which has suitable solubility characteristics, such as 2-ethyl hexanol, isopropanol, various aromatic solvents such as Solwesso 150, aliphatic ester alcohols such as Texanol (2,2,4-trimethyl-1,3-pentanediol monoisobutyrate), isophorone, mixtures of same, and the like. With the copolymers of the invention, it is not necessary to remove the solvent in order that the copolymers be effective as defoamers. However, for the sake of safe transportation, volatile solvents such as toluene and isopropanol can optionally be removed. Non-volatile solvents or those of a high flash point (e.g., DPG and ethylhexanol) do not pose the same safety problems, and there is no need to remove them.

Some of the compositions of the invention (such as the preferred composition) are hydrophobic and will precipitate as a white gel when introduced into water.

Use of the Copolymers

For defoamers, the modified polysiloxane is typically blended with DAP (which is commercially available), and added to the petroleum product at a refinery. For demulsifiers, the polysiloxane copolymer is dissolved in an aromatic compound, and then added to the crude oil.

The polysiloxane copolymers of the invention should be added at about 5 ppm to the diesel fuel. Preferably, a minimum amount of polysiloxane copolymer is used and the preferred range of addition is at 2 ppm to 4 ppm. The polysiloxanes of the invention should be added at about 10 ppm to about 50 ppm to the crude oil to provide adequate separation of the crude oil and water content.

Characteristics of the Copolymer

The solubility pattern, molecular weight distribution and surface tension reduction are is physical properties useful to assess the compositions of the invention.

Table 2 reveals the solubility pattern of one of organosilicones of the invention made from MD100D*24M silicone hydride (D*=HSiOCH$_3$) and TMPMAE as a sole substituent.

TABLE 2

Solubility pattern of organosilicone made from MD100D*24M and TMPMAE

| | Concentration of MD100D' 24M: | | | | |
|---|---|---|---|---|---|
| Solvent | 1% | 5% | 10% | 20% | 50% |
| Diesel fuel | No | No | No | No | No |
| 2-Ethylhexanol | Yes | Yes | Yes | Yes | Yes |
| Xylene | No | No | No | No | Yes |
| Solvesso 100 | No | No | No | No | Yes |
| Solvesso 150 | No | No | No | No | Yes |
| Propylene carbonate | No | No | No | No | No |
| Vammar D 10N | No | No | No | No | No |

Yes = soluble in solvent at ambient conditions
No = insoluble in solvent at ambient conditions The following illustrative and comparative examples describe the instant invention in more detail. However, they are not intended to limit the scope of the specification and the claims.

EXAMPLES

Organosilicone Examples

Example 1

The equilibrate MD100D*24M (D*=HSiOCH$_3$), containing 2.5*10^(-3) mole of active hydrogen per gram was blended with TMPMAE and dipropyleneglycol which constituted 50% of the total charge. A 30% molar excess of allyl bond was employed. Reaction was catalysed with 15 ppm of platinum added as a solution of chloroplatinic acid. An exotherm of 15 deg. was produced and reaction came to completion within 45 minutes.

The product was applied as a diesel fuel defoamer at the concentration equivalent to 1.1 ppm of silicon. The antifoam properties were recorded. In practical terms there was no foam formation.

Example 2

An equilibrate MD44D*11M of an active hydrogen content 2.5 mmoles per gram was blended with TMPMAE and dipropylene glycol and reaction was triggered with 15 ppm of platinum at 70 deg.C. An exotherm about 15 deg was developed within several minutes and reaction was completed within less than 45 minutes.

The product applied in diesel fuel at a concentration of 1.1 ppm of silicon exhibited excellent performance characteristics as the initial foam volume was reduced to about 20% and the defoam time was about 10% of the blank (standard).

Example 3

An equilibrate MD100D*24M of an active hydrogen content 2.5 mmoles per gram was blended with TMPMAE and polyether composed of seven moles of ethylene oxide and terminated with methyl group (60/40 molar) and DPG as a reaction solvent. The reaction was triggered with 15 ppm of platinum at 70 deg.C. An exotherm about 15 deg was developed within several minutes and reaction was completed within less than 45 minutes.

The product of reaction was applied as a defoamer in one of diesels available on the French market. The product exhibited defoaming characteristics similar to that of Example 1. Both products applied at the concentration 0.50 ppm of Si eliminated virtually all foaming as the volume of foam was below 5% and the defoam time was between 1 and 4 seconds.

Example 4

An equilibrate MD100D*24M of an active hydrogen content 2.5 mmoles per gram was blended with TMPMAE and polyether composed of seven moles of ethylene oxide and terminated with methyl group (50/50 molar) and 2-ethylhexanol as a reaction solvent. The reaction was triggered with 15 ppm of platinum at 70 deg.C. An exotherm about 15 deg was developed within several minutes and reaction was completed within less than 45 minutes.

The product of reaction was applied as a defoamer in one of diesels available on the French market. The product exhibited defoaming characteristics similar to that of Example 1. Both products applied at the concentration 0.50 ppm of Si eliminated virtually all foaming as the volume of foam was below 5% and the defoam time was between 1 and 4 seconds.

Comparative Example (DE 4032006)

The equilibrate as described in example 2 was diluted with dioxane and an adequate amount of 1,4 butyn-2 diol was added. Reaction was catalysed with a catalyst as described in the German patent (DE 4032006-A). About forty hours and an extra catalyst and butyndiol were needed to complete the reaction.

The same performance as for Example 1 was achieved at about a forty percent higher silicon concentration in diesel.

In all preparations a 30% molar excess of unsaturated bond was employed.

Diesel Antifoam Performances

The performance of diesel defoamer is assessed in terms of either the foam volume obtained by injecting 100 cc of fuel to the graduated cylinder or by time needed to achieve clean fuel surface in the cylinder. The time of defoaming is often expressed as a percent of time needed for a blank, untreated sample of fuel. In this case, lower values indicate faster foam collapse and more efficient defoamer.

The amount of silicon introduced into fuel should be as low as possible and usually the efficiency of a defoamer increases with the increased amount of silicon in fuel. Diesel fuels are very often treated with DAP additives which are introduced into fuel to improve the performance of the engine. It is therefore important that the defoamer applied should maintain its performance characteristics in the presence of DAP.

Table 3 records data related to several examples of the composition of the invention made with aliphatic diols as a sole grafted groups including TMPMAE, allylglycerol, cyclic derivatives of diols and a comparative example with 2-butyn-1,4diol. An example with polyether as the grafted group is also included. All organosilicones are diluted with the reaction solvent and were prepared according to procedures described in Examples 1 to 3 above and were applied at 10 ppm treat rate, irrespective of the silicon content in the molecule.

TABLE 3

Performance of diesel defoamers of different structures, all tested at 10 ppm (products are diluted with the reaction solvent)

| siloxane backbone | olefin grafted | Reference | rel. collapse time (%) |
|---|---|---|---|
| NA | NA | blank | 100 |
| MD100D*24M | polyether/Eugenol | SAG TP-325, | 24 |

TABLE 3-continued

Performance of diesel defoamers of different structures, all tested at 10 ppm (products are diluted with the reaction solvent)

| siloxane backbone | olefin grafted | Reference | rel. collapse time (%) |
|---|---|---|---|
| | | commercial | |
| MD100D*24M | TMPMAE | A | 2 |
| MD100D*24M | TMPMAE/polyether (60/40 mol) | B | 4 |
| MD102D*18M | TMPMAE | C | 1 |
| MD44D*11M | formal of allylglycerol | D | 94 |
| MD44D*11M | formal of TMPMAE | E | 88 |
| MD44D*11M | polyether, of seven moles of ethylene oxide on allyl alcohol | F | 46 |
| MD44D*11M | 2-butyn-1,4 diol | G | 2 |
| MD44D*11M | allylglycerol | H | 2 |
| MD44D*11M | TMPMAE | I | 6 |
| MD48D*12M | TMPMAE | J | 16 |
| MD42D*7M | TMPMAE | K | 13 |

The fuel used was obtained from SHELL and is a heavily foaming diesel producing about 217 cc of foam from 100 cc of liquid with the defoam time about sixty seconds. A dramatic loss of performance was recorded for polyether and cyclic formals substituted siloxanes. The use of a cyclic formal instead of diol reduced substantially the overall polarity of siloxane, for the same molar fraction of D units. The use of an uncapped polyether from seven moles of ethylene oxide reduced the molar fraction of D units from about eighty to fifty percent. The use of capped polyether instead of the uncapped one as quoted in Table 3 results in the same mediocre performance.

The adjustment of the treat rate to the same silicon content modified the order of efficiency of the defoamer. SAG TP-325 (that is, the state-of-the-art commercial diesel fuel defoamer; (made by WITCO OrganoSilicone) was used as a reference at 10 ppm treat rate, which this corresponds to 0.90 ppm of silicon introduced into fuel. The same diesel from SHELL was used and findings for different defoamers, all at 0.90 ppm of silicon, are collected in Table 4.

TABLE 4

Performance of diesel defoamers at 0.90 ppm of silicon in fuel

| Reference | foam volume (cc) | relative collapse time % | collapse time (sec) |
|---|---|---|---|
| blank | 217 | | 66 |
| TP-325 | 150 | 24 | 16 |
| A | 113 | 15 | 10 |
| G | 123 | 20 | 13 |
| H | 105 | 3 | 2 |
| I | 110 | 8 | 5 |

(References A, G, H and I are the same as in Table 3.)

It was apparent that the material G containing residual unsaturation was outperformed by defoamers made with saturated olefins. Structures G, H and I were all made with the same siloxane backbone.

It can also be demonstrated that the organosilicone containing the residual unsaturation is more sensitive to ingredients of DAP and its performance will decline rapidly during aging.

Table 5 shows structures and performance, as a foam volume, of the diesel defoaming agents which are TMPMAE derivatives. Where the value for the volume of foam is equal or less than 105 cc (that is, from about 100 cc to about 105 cc of fuel), this is indicative of no essentially foaming, in practical terms. In contrast, foam volumes exceeding 150 cc indicates an unsatisfactory defoaming characteristics of the organosilicone defoamer. Stable performance of a defoamer is particularly important where formulated fuels are likely to be stored several weeks before their use. Example G and G type are organosilicones with residual unsaturation and correspond to the description of the above Comparative Example. The loss of the performance is seen for G type derivatives. This degradation of performance is enhanced by the presence of DAP.

The following foam volumes in Table 5 were found for various fuel which were either untreated or contained some DAP. The collapse time for the foam volumes equal to or less than 105 cc is not addressed, since there is essentially no foaming for these values.

TABLE 5

Structures and performance, as a foam volume, of the diesel defoaming agents which are 100% substituted with TMPMAE

| Reference | Diesel type | DAP ppm | ppm Si in fuel | volume (cc) day 0 | volume (cc) day 17 | volume (cc) day 42 |
|---|---|---|---|---|---|---|
| TP-325 | D1 | 200 | 0.45 | 130 | 130 | + |
| A | D1 | 200 | 0.22 | 105 | + | + |
| A | D1 | 200 | 0.55 | 105 | + | + |
| B | D1 | 200 | 0.50 | 105 | + | + |
| G type | D1 | 200 | 1.00 | 102 | 110 | + |
| B | D2 | none | 0.50 | 105 | 130(*) | 160(**) |
| G type | D2 | none | 0.50 | 105 | 177(*) | 183(**) |
| I | D3 | none | 0.90 | 110 | 120 | 127 |
| G | D3 | none | 0.90 | 120 | 140 | 173 |
| G type | D3 | none | 0.90 | 105 | 208 | 205 |
| I | D4 | 1000 | 0.90 | 105 | 110 | 140 |
| G | D4 | 1000 | 0.90 | 167 | 190 | 190 |
| G type | D4 | 1000 | 0.90 | 110 | 160 | 180 |

+ = data not available
(*) = 15 days
(**) = 32 days
(References A, B, G and I are the same as in Table 3.) Examples in diesel D1 are to show the efficiency of new structures as related to silicon content.

Table 6 shows classification by molecular weight, and Table 7 shows classification by performance (where lower values indicate more efficient defoaming) for TMPMAE derivatives. Tables 6 and 7 describe also the total size of polysiloxane, the ratio of D/D', and the activity of product (degree of dilution).

TABLE 6

(TMPMAE)
Classification per mol. weight

| Siloxane | Total D + D' (M') | D/D' (M') | Synthesis N° | % active | Performance 1) |
|---|---|---|---|---|---|
| M'D2M' | 2 | 1 | RH 368-248 | 80 | 95% |
| M'D3M' | 3 | 1.5 | MG 261 | 80 | 99% |
| M'D4M' | 4 | 2 | RH 368-202 | 75 | 72% |
| M'D5M' | 5 | 2.5 | MG 289 | 80 | 58% |
| M'D8M' | 6 | 3 | MG 292 | 80 | 94% |
| M'D7M' | 7 | 3.5 | MG 295 | 80 | 47% |
| M'D10M' | 10 | 5 | PH 368-288 | 50 | 89% |
| MD8D*2M | 10 | 4 | RH 17122-4 | 50 | 62% |
| M'D15M' | 15 | 7.5 | RH 368-289 | 50 | 96% |
| M'D20M' | 20 | 10 | RH 368-290 | 50 | 100% |
| MD'16D*4M | 20 | 4 | RH 17122-5 | 50 | 18% |
| MD24D*6M | 30 | 4 | RH 17122-6 | 50 | 12% |
| MD42D*7M | 49 | 6 | RH 368-214 | 50 | 13% |
| MD44D*11M | 55 | 4 | RH 368-260 | 50 | 6% |
| MD48D*12M | 60 | 4 | RH 368-203 | 50 | 16% |
| MD102D*18M | 120 | 5.7 | RH 368-212 | 50 | 1% |
| MD100D*24M | 124 | 4.2 | RH 368-170 | 50 | 2% |

Performance is gauged in relative collapse time.

TABLE 7

Classification per performance

| Siloxane | Total D + D' | D/D' (M') | Synthesis N° | % active | Performance 1) |
|---|---|---|---|---|---|
| M'D20M' | 20 | 10 | RH 368-290 | 50 | 100% |
| M'D3M' | 3 | 1.5 | MG 261 | 80 | 99% |
| M'D15M' | 15 | 7.5 | RH 368-289 | 50 | 96% |
| M'D2M' | 2 | 1 | RH 368-248 | 80 | 95% |
| M'D6M' | 6 | 3 | MG 292 | 80 | 94% |
| M'D10M' | 10 | 6 | RH 368-288 | 50 | 89% |
| M'D4M' | 4 | 2 | RH 368-202 | 75 | 72% |
| MD8D*2M | 10 | 4 | RH 17122-4 | 50 | 62% |
| M'D5M' | 5 | 2.5 | MG 289 | 80 | 58% |
| M'D7M' | 7 | 3.5 | MG 295 | 80 | 47% |
| MD16D*4M | 20 | 4 | RH 17122-5 | 50 | 16% |
| MD48D*12M | 60 | 4 | RH 368-203 | 50 | 16% |
| MD42D*7M | 49 | 6 | RH 368-214 | 50 | 13% |
| MD24D*6M | 30 | 4 | RH 17122-6 | 50 | 12% |
| MD44D*11M | 55 | 4 | RH 368-260 | 50 | 6% |
| MD100D*24M | 124 | 4.2 | RH 368-170 | 50 | 2% |
| MD102D*18M | 120 | 5.7 | RH 368-212 | 50 | 1% |

Notes:
1) Tested in Diesel Shell at 10 ppm and 20° C. (relative collapse time)
Performance is gauged in relative collapse time.

Crude Oil Demulsification Performances

Several experiments were carried out with a crude from Trecate oilfield (North of Italy). The concentration of water was adjusted to 20% and the crude oil was agitated to form an emulsion. The volume of separated water was recorded with time. The reference was an organic demulsifier from TROS Company.

Figures are collected in Table 8.

TABLE 8

Rate of Trecate crude oil separation

| Sample | 5 min | 10 min | 15 min | 30 min | 60 min | 120 min |
|---|---|---|---|---|---|---|
| 10 ppm TROS 6002X | 0 | 0 | 0 | 5 | 5 | 5 |
| 100 ppm TROS 6002X | 40 | 41 | 41 | 41 | 42 | 42 |
| 10 ppm RH 265 | 0 | 0 | 5 | 25 | 35 | 37 |
| MD100D'24M | 25 | 33 | 35 | 38 | 38 | 40 |
| 10 ppm RH 273 | 0 | 5 | 25 | 30 | 35 | 37 |
| 10 ppm RH 275 | 0 | 0 | 0 | 0 | 5 | 10 |
| MD42D*7M | 0 | 0 | 0 | 0 | 0 | 0 |

RH 265 = MD44D*11M + polyether composed from seven moles of ethylene oxide and terminated with an allyl group and a methyl group.
MD100D'24M = Example 1 in organosilicone examples above.
RH 273 = MD44D*11M + TMPMAE (as in Example 2 in organosilicone examples above).
RH 275 = MD44D*11M + a cyclic formal made from TMPMAE and formaldehyde.
MD42D'7M = MD42D*7M + TMPMAE.
TROS 6002X = organic demulsifier All numbers are reported in millimeters of separated water and this parallels the volume. The total separation corresponds to ca. 42 mm reading. Structures employed were made with TMPMAE, except RH-265 and RH-275, and are described in previous Tables of this report.

RH-265 was made with MD44D*11M and polyether and offered very mediocre performance as diesel defoamer. The low effectiveness of RH-275, made with TMPMAE formal, is significant and parallels findings for diesel defoamers. It appears that longer siloxane chains (Example 1 vs Example 2 in organosilicone examples) speed up the separation. As persons skilled in this art would appreciate, any general statement should to be avoided due to variety of crudes.

The silicones listed were better than an organic demulsifier at 10 ppm concentration, but even in the best case (Example 1 in organosilicone examples) they were outperformed by the TROS reference employed at 100 ppm. The increase of MD100D*24M concentration to 25 ppm did not accelerate the separation.

Lubricating Oil Performance

Several experiments were carried out with a typical lubricating oil as supplied by one of leading oil companies. The test consisted of passing dispersed air at the rate of 200 cc/min through 200 cc of oil during 5 minutes, recording the volume of oil/gas and setting the air flow rate at 100 cc/min during the second part of measurements when the decay of foam is recorded.

The virgin oil and that treated with a known industry reference defoamer (available commercially under the trade name "ELF") was tried as control. Figures are collected in Table 9.

TABLE 9

| Antifoam | conc. ppm | initial foam volume cc | volume after 1 min cc | volume after 2 min cc | volume after 3 min cc |
|---|---|---|---|---|---|
| none | NA | 400 | 260 | 220 | 205 |
| control | 200 | 200 | | | |
| ex. I | 50 | 200 | | | |
| ex. A | 50 | 200 | | | |
| ex. A | 20 | 200 | | | |

The total foam abatement was achieved at very low concentration of organosilicones and the deareation time is substantially reduced compared to neat dimethylsiloxanes. Where the initial foam volume is 200 cc, this indicates the presence of essentially no foam. Deaeration at 20 ppm corresponds to the density with an organic reference employed at 200 ppm (0.844). Thus, the compounds of the invention provide rates of deaeration comparable to organic defoamers, at low treat rates comparable to silicone oil defoamers.

While the invention has been described in detail and with reference to specific embodiments thereof, it will be apparent to those of ordinary skill in the art that various changes and modifications can be made therein without departing from the spirit and scope thereof.

The entire contents of all references mentioned above are incorporated herein by reference.

What we claim is:

1. A polyorganosiloxane comprising at least one repeat unit each of a dimethylsiloxy group;

a siloxy group comprising a polyhydric $C_6$–$C_{28}$ organic group which is completely saturated; and a siloxy group comprising a phenol derivative or a long chain aliphatic group.

2. A polyorganosiloxane as in claim 1 having the formula:

$MD_xD'_yD''_zM$ where M is $O_{0.5}Si(CH_3)_3$;

D is $OSi(CH_3)_2$;

D' is $OSiCH_3R$ and R is a polyhydric $C_6$–$C_{28}$ organic group which is completely saturated;

D" is $OSiCH_3R'$; where R' is a phenol derivative or a long chain aliphatic group;

z is a positive number up to 80;

x+y+z=10–200;

x/z≧1; and x/(y+z) is between 2.0 and about 10.0.

3. A polyorganosiloxane as in claim 1 wherein said phenol derivative group is derived from eugenol.

4. A polyorganosiloxane as in claim 1 wherein said long chain aliphatic group is a $C_{10}$–$C_{20}$ aliphatic group.

5. A polyorganosiloxane as in claim 1 wherein said polyhydric $C_6$–$C_{28}$ organic group is derived from a member of the group consisting of trimethylolpropane monoallyl ether, ethoxylated pentaerythritol allyl ether, propoxylated pentaerythritol allyl ether, tri-isopropanolamine allyl ether, ethoxylated allyl sorbitol, and allylpropanediol 1,3.

6. A lubricating oil composition comprising a defoaming effective amount of a polyorganosiloxane as in claim 1.

* * * * *